United States Patent
Lace

[15] 3,696,260
[45] Oct. 3, 1972

[54] PERMANENT MAGNET ROTOR STRUCTURE

[72] Inventor: Melvin A. Lace, Prospect Heights, Ill.

[73] Assignee: Motorola, Inc., Franklin Park, Ill.

[22] Filed: Aug. 2, 1971

[21] Appl. No.: 168,243

[52] U.S. Cl.................................310/156, 310/263
[51] Int. Cl...............................................H02k 21/12
[58] Field of Search.....310/156, 46, 49 A, 49 K, 263

[56] References Cited

UNITED STATES PATENTS

| | | |
|---|---|---|
| 3,459,980 | 8/1969 | Coroller...............310/156 X |
| 3,571,637 | 3/1971 | Henningry et al. ....310/263 X |
| 3,452,228 | 6/1969 | Woolley................310/263 X |
| 3,411,027 | 11/1968 | Rosenberg............310/156 X |
| 3,513,341 | 5/1970 | Gratzmuller..........310/263 X |
| 3,553,511 | 1/1971 | Hemmings et al. ....310/263 X |

*Primary Examiner*—D. F. Duggan
*Attorney*—Vincent Rauner et al.

[57] ABSTRACT

A rotor structure for a permanent magnet alternator includes a plurality of alternate laminations of circular ceramic magnets polarized through the thickness thereof and thin circular sheets of iron. The polarity of the magnets is reversed in alternate layers. The iron sheets each include a plurality of tabs extending radially outwardly therefrom and which are bent over an adjacent magnet. Alternate sheet metal layers are shifted about the axis of rotation of the structure so that the tabs of alternate sheets are out of alignment with respect to each other. The tabs effectively join the magnetic poles of adjacent magnets to provide a series of strip-like magnetic poles extending in a direction parallel to the axis of rotation of the rotor structure and spaced circumferentially thereabout.

5 Claims, 3 Drawing Figures

PATENTED OCT 3 1972

3,696,260

INVENTOR:
MELVIN A. LACE
BY: Ronald L. LaForte
ATTY.

PERMANENT MAGNET ROTOR STRUCTURE

BACKGROUND OF THE INVENTION

This invention relates generally to rotating permanent magnet type electrical machinery and more particularly to the construction of the permanent magnet rotor for such machinery.

It is desirable in compact electrical machinery, such as, for example, permanent magnet alternators and generators used in snowmobiles and the like equipment, to provide a rotating permanent magnet structure, commonly referred to as a rotor, which is small, yet has sufficient magnetic field strength to produce adequate electrical current for powering a load, and which is lightweight, low in cost and relatively easy to fabricate.

SUMMARY OF THE INVENTION

Accordingly, it is a primary object of the present invention to provide a new and improved rotor structure for a permanent magnet generator.

It is another object of the present invention to provide a new and improved permanent magnet rotor structure for an electrical machine, which is compact in design and easy to fabricate.

It is yet another object of the present invention to provide a permanent magnet rotor of the above described type which provides a relatively high magnetic field strength compared with its size and which is relatively lightweight and low cost.

Briefly, a preferred embodiment of a permanent magnet rotor according to the invention includes a plurality of alternate circular laminations or layers of bonded ferrite or the like magnets polarized through the thickness thereof and thin sheets of steel or iron. The iron layers each include a plurality of tabs extending outwardly therefrom and which are bent over an adjacent permanent magnet laminate to provide a flux path to the stator portion of the alternator or generator in which the rotor is incorporated. The polarity of alternate layers of the ceramic magnets is reversed with respect to each other to provide alternating north and south poles to the iron sheets throughout the axial extent of the rotor. The assembled structure provides alternate axially extending north and south magnetic poles spaced circumferentially thereabout.

DETAILED DESCRIPTION

Figure 1:
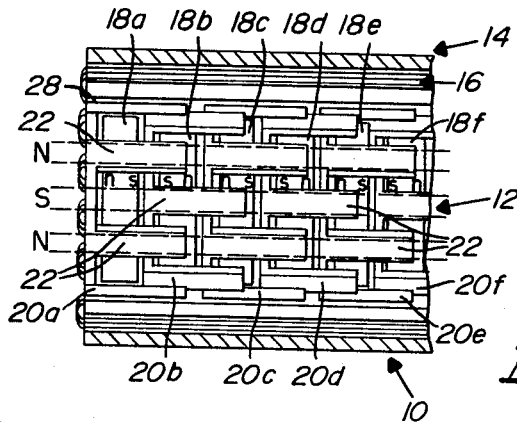
FIG. 1 is a side, cutaway view of a permanent magnet alternator including a permanent magnet rotor according to the invention.

Referring now to the drawing in greater detail wherein like numerals have been employed throughout the various views to designate similar parts, there is illustrated in FIG. 1 a permanent magnet alternator 10 including a permanent magnet rotor structure 12 according to the invention.

The alternator includes the usual stator 14 formed of magnetic material such as, for example, iron, and which is wound with coils of wire 16 through which current, induced by the action of the rotating permanent magnet rotor, passes.

As can be seen from the figures of the drawing, the rotor structure 12 according to the invention includes a plurality of washer shaped magnets, 18a, 18b, 18c, 18d, etc. The magnets are of a high cohercive force, low permeability type, preferably of the well known bonded ferrite or ceramic variety, polarized through the thickness thereof and each having a radius of a predetermined length. Suitable magnets are those sold under the trade name Plastiform. The rotor structure also includes a plurality of thin washer shaped magnetizable sheets, 20a, 20b, 20c, 20d, etc., preferably of steel or iron material, each having a radius of a length substantially equal to that of the magnets. Each of the metal circular sheets includes a plurality of tabs, such as 22, extending outwardly from the edge thereof. The tabs are spaced a predetermined number of degrees, herein approximately 60°, from each other about the circumference of the washer.

The ceramic magnets and metallic sheets are stacked in alternate layers and the tabs 22, which initially extend radially outwardly from the circular sheet as shown in dotted lines, are bent over along the outer surface of an adjacent magnet, substantially parallel to the axis of rotation 24 of the rotor structure.

The polarity of alternate ones of the permanent magnets is reversed and alternate magnetizable sheets are rotated 30° with respect to each other so that the tabs of alternate sheets are in alignment (FIG. 1) and extend parallel to the axis of rotation of the rotor structure.

Figure 2:
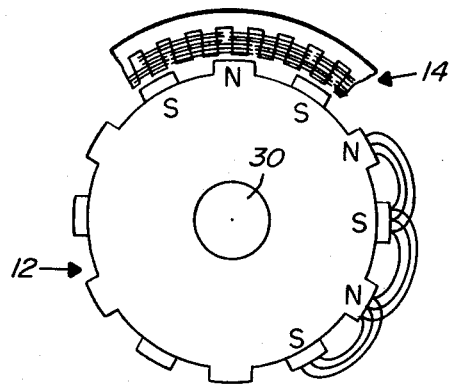
FIG. 2 is an end view of the alternator rotor of FIG. 1.
Figure 3:
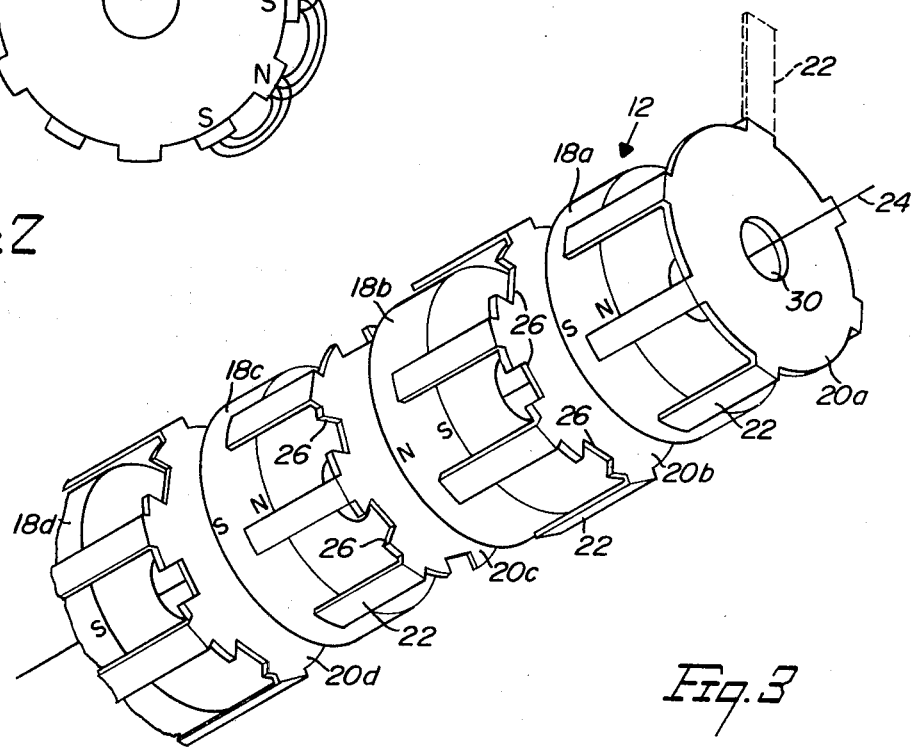
FIG. 3 is an exploded perspective view of the permanent magnet rotor of FIGS. 1 and 2.

Each of the tabs extends from one magnetic pole of a ceramic magnet to a like pole of the adjacent magnet, thus in effect, providing a series of opposite magnetic poles spaced about the periphery of the rotor structure (see FIGS. 1 and 2). To minimize magnetic interaction between the magnetizable tabs of one sheet with the adjacent sheet, small cutouts 26 can be provided in the sheets at the periphery thereof intermediate the tabs.

The use of ceramic or the like permanent magnets having a high cohercive magnetic force makes the rotor structure according to the invention feasible. The magnets, as is well known, are fabricated of a ceramic material with tiny magnetic particles impregnated therein. The particles are oriented to provide, effectively, a magnet having north and south poles at each end thereof. Because these types of magnets have high cohercive magnetic force and thus low permeability, they lend themselves to the subject rotor structure; i.e. the additive magnetic effect produced with the combination of the magnets and thin magnetizable sheets having the bendable tab members described.

It should be noted that at the ends of the rotor structure, herein at permanent magnet 18a, no tab is provided for the south magnetic poles. However, because the magnets are generally of a narrow thickness, the lack of such a tab does not reduce the magnetic flux of the rotor to any great extent. If desired, however, a second sheet of magnetizable material in engagement with sheet 20b may be provided with tabs bent in a direction opposite from those shown and of a length sufficient to cover the south pole portion of ceramic magnet 18a. Likewise, at the opposite end of the rotor structure (not shown) compensation for the lack of material at the north poles can be made as well.

An end view of the rotor structure according to the invention (FIG. 2) illustrates the magnetic fields provided by the arrangement of magnetizable sheets and ceramic magnets.

In operation, the magnetic fields produced as shown, are cut by the coil wound on the stator during rotation of the rotor structure about a non-magnetic center shaft (not shown) received in the center opening 30 of the structure. The cutting of the magnetic fields induces a current flow in the coil which is fed therefrom by suitable conductors (not shown) for use in the environment in which the alternator is located. The air gap 28 between the rotor and stator should have similar magnetic reluctance as the total reluctance of the magnetic sections for most efficient operation.

Because the rotor structure employs ferrite or the like permanent magnets, and thin metal flux carriers, it is relatively lightweight and easily rotatable. Assembly of the rotor structure can be accomplished with ease; the only steps therein being to stack the layers or laminates properly and to bend over the tabs in a proper manner.

Thus, the permanent magnet rotor structure according to the invention provides a lightweight, compact, easily assembled structure for use in the permanent magnet alternators or generators of small vehicles, such as, for example, snowmobiles, etc.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What is claimed is:

1. A rotor structure for a permanent magnet electrical generating machine, including in combination: a plurality of permanent magnet sections and a plurality of sheets of magnetizable material arranged in alternate layers with respect to each other, the axis of said rotor structure extending substantially perpendicular to said layers, and alternate ones of said permanent magnet sections being oppositely poled with respect to each other, each of said magnetizable sheets including a plurality of tabs extending outwardly therefrom, said tabs being bent axially over an adjacent permanent magnet section and in close proximity with an alternate magnetizable sheet to provide a magnetic flux path, said tabs on alternate magnetizable sheets being spaced from each other peripherally about the rotor structure to provide alternate north and south magnetic poles thereabout.

2. A rotor structure as claimed in claim 1 wherein each of said permanent magnet sections comprises magnetic material of the bonded ferrite type.

3. A rotor structure as claimed in claim 2 wherein said permanent magnet sections are polarized through the thickness thereof, the magnets being stacked axially throughout said rotor structure.

4. A rotor structure as claimed in claim 1 wherein said permanent magnet sections and sheets of magnetizable material are circular dimensionally having radii substantially equal in length and wherein said permanent magnet sections and sheets of magnetizable material include centrally located apertures aligned with respect to each other for receipt of a rotatably mounted non-magnetic shaft therethrough.

5. A rotor structure as claimed in claim 4 wherein said tabs on any one of said magnetizable sheets are spaced a predetermined number of degrees from each other about the circumference thereof.

* * * * *